United States Patent

Hasushita et al.

Patent Number: 5,752,107
Date of Patent: *May 12, 1998

[54] REAL IMAGE FINDER SYSTEM FOR A CAMERA

[75] Inventors: Sachio Hasushita; Masato Noguchi; Kazuhiro Yamada; Ichiro Taguchi; Masahiro Inazuka, all of Tokyo, Japan

[73] Assignee: Asahi Kogaku Kogyo Kabushiki Kaisha, Tokyo, Japan

[*] Notice: The term of this patent shall not extend beyond the expiration date of Pat. No. 5,537,184.

[21] Appl. No.: 857,564

[22] Filed: May 16, 1997

Related U.S. Application Data

[63] Continuation of Ser. No. 587,985, Jan. 17, 1996, abandoned, which is a continuation of Ser. No. 354,093, Dec. 6, 1994, Pat. No. 5,537,184.

[30] Foreign Application Priority Data

Jan. 25, 1994 [JP] Japan .................................. 6-000192

[51] Int. Cl.[6] .................................................. G03B 13/08
[52] U.S. Cl. .................................... 396/296; 396/386
[58] Field of Search ................................ 396/281, 287, 396/290, 291, 292, 296, 373, 384, 385, 386

[56] References Cited

U.S. PATENT DOCUMENTS

| | | |
|---|---|---|
| 4,299,462 | 11/1981 | Suzuki et al. . |
| 4,750,014 | 6/1988 | Frank . |
| 4,972,216 | 11/1990 | Ueda et al. . |
| 5,130,855 | 7/1992 | Mukai et al. . |
| 5,148,202 | 9/1992 | Yoshida . |
| 5,363,163 | 11/1994 | Hayashi et al. . |
| 5,406,399 | 4/1995 | Koike . |
| 5,537,184 | 7/1996 | Hasushita et al. ............... 354/471 |

FOREIGN PATENT DOCUMENTS

8802877   4/1988   WIPO .

OTHER PUBLICATIONS

United Kingdom Search Report issued Feb. 5, 1996.

*Primary Examiner*—David M. Gray
*Attorney, Agent, or Firm*—Greenblum & Bernstein P.L.C.

[57] ABSTRACT

A real image finder system of a camera has an objective lens, an eyepiece lens and deflecting system. The deflecting system includes an erecting system positioned between the objective lens and the eyepiece lens. The finder system also includes an LCD panel that is located on an image plane of the objective lens with the LCD panel displaying information which is viewed through the eyepiece lens. A first polarizer is positioned between the objective lens and the LCD panel while a second polarizer is positioned between the LCD panel and the eyepiece lens. The first and second polarizers are arranged such that their transmission axes are perpendicular to each other. Further at least one optical component of the deflecting system is located between the first polarizer and the second polarizer.

18 Claims, 13 Drawing Sheets

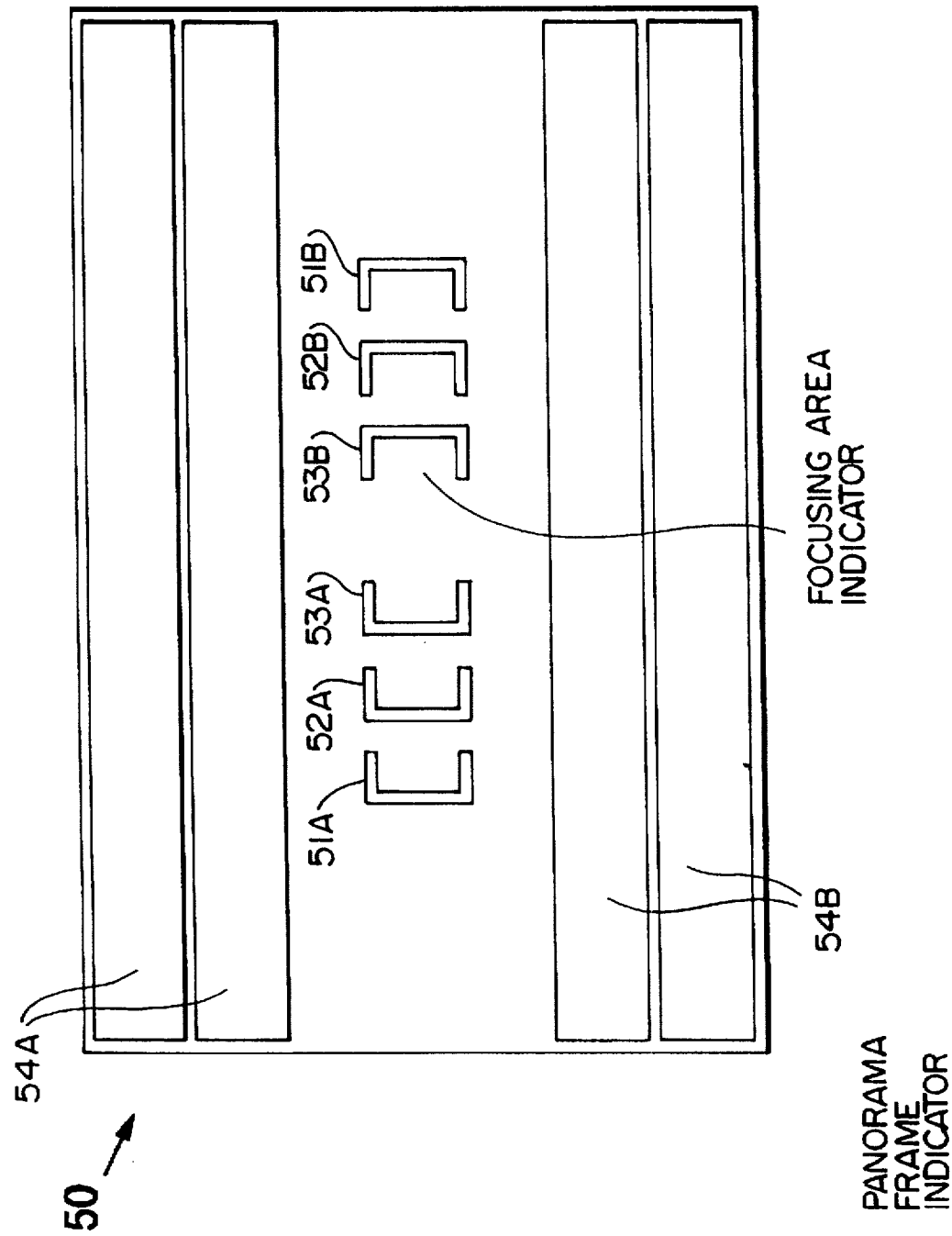

REAL IMAGE FINDER SYSTEM FOR A CAMERA

This application is a continuation of application Ser. No. 08/587,985 filed Jan. 17, 1996, now abandoned, which is a continuation of application Ser. No. 08/354,093, filed Dec. 6, 1994, now U.S. Pat. No. 5,537,184, issued Jul. 16, 1996.

BACKGROUND OF THE INVENTION

The present invention relates to an optical finder system employed in a camera, and more specifically to a real image optical finder system in a camera having an LCD display panel for displaying information superimposed on an image seen in the finder.

In a real image type optical finder an image of an object is formed on an imaging plane by an objective lens group. Then this image is viewed by a user using an eyepiece lens group. In order for information shown on the LCD display to be viewed, the LCD display must be located in a plane coincident with the image plane.

The information displayed on the LCD panel will be superimposed on the image seen in the finder and may include alphanumeric characters. Further, lines or symbols which delimit an area of the image that is used by a distance measuring device to determine a distance of an object from the camera, may also be displayed.

Recently, zoom compact cameras have been introduced which employ the above mentioned real image optical finder system. In these cameras, the finder also includes a moving lens group, which is used to vary a magnification of an image seen in the finder in accordance with a focal length of the photographing lens. The information displayed on the LCD display can be changed as the focal length is changed.

The LCD display consists of an LCD panel and a polarizer disposed on either side of the LCD panel and close to the LCD panel. With this construction, there are six surfaces associated with the LCD display that are located very close to the image plane. During manufacturing of the camera and with normal use of the camera, dust particles which may enter the finder system can adhere to the six surfaces. The dust particles are therefore visible to the viewer resulting in an undesirable image being seen through the finder.

One method of reducing the number of surfaces near the image plane has been to move the polarizers sufficiently far away from the LCD panel so that they are out of focus. However, with this construction, the size of the finder becomes large, making it difficult to reduce the size of the camera.

SUMMARY OF THE INVENTION

It is therefore an object of the present invention to provide an optical finder having an LCD display for superimposing information onto an image seen through the finder while at the same time minimizing the overall size of the finder.

In order to achieve the objects, according to the present invention, there is provided a real image finder system of a camera having an objective lens, an eyepiece lens and deflecting system that includes an erecting system positioned between the objective lens and the eyepiece lens, the finder system comprising: an LCD panel that is located on an image plane of the objective lens, the LCD panel displaying information to a photographer through the eyepiece lens; a first polarizer positioned between the objective lens and the LCD panel; a second polarizer positioned between the LCD panel and the eyepiece lens, wherein the first polarizer and the second polarizer are arranged so that the transmission axes are vertical to each other; and at least one optical component of the deflecting system is located between the first polarizer and the second polarizer.

Optionally, the deflecting system may have a front optical component located between the first polarizer and the LCD panel, and a rear optical component located between the second polarizer and the LCD panel.

Further, the deflecting system may have the front optical component only between the polarizers or may have the rear optical component only between the polarizers.

When the at least one optical component comprises a first type element that has two reflection surfaces, incident planes of said two reflecting surfaces, each of said incident planes defined as a plane that includes a ray of light along an optical axis of said objective lens and a normal to one of said reflecting surfaces, are not parallel and are not perpendicular to each other, the direction of the transmission axis of one of the polarizers should be equivalent to a direction parallel to a long side of a finder view field and the direction of the transmission axis of the other polarizer should be equivalent to a direction parallel to a short side of the finder view field.

Further, the first type element may be a Dach mirror that is arranged so that a ridge line is included in a plane that contains the optical axis and is parallel to the long side of the finder view field. The Dach mirror is arranged so that the angle between the ridge line and said optical axis becomes 45 degrees.

When the optical components are provided with a second type element that has two reflection surfaces which have incident planes that are parallel to each other and do not have the first type element, the direction of the transmission axis of one of the polarizers should be along the direction of the long side of the finder field of view, or at an angle of 45° relative to the long side of the finder field of view. Further, the direction of the transmission axis of the other polarizer is perpendicular to the first polarizer.

When all of the optical components are a third type element which has two reflecting surfaces having incident planes that are perpendicular to each other, the directions of the transmission axis of the first polarizer may be at any angle.

Still further, the second type element may be a pentaprism, and the third type element may be a Porro prism.

BRIEF DESCRIPTION OF THE DRAWINGS

FIG. 3 shows an example of information displayed on an LCD display panel used in the first embodiment shown in FIG. 1;

DESCRIPTION OF THE EMBODIMENTS

Figure 14:
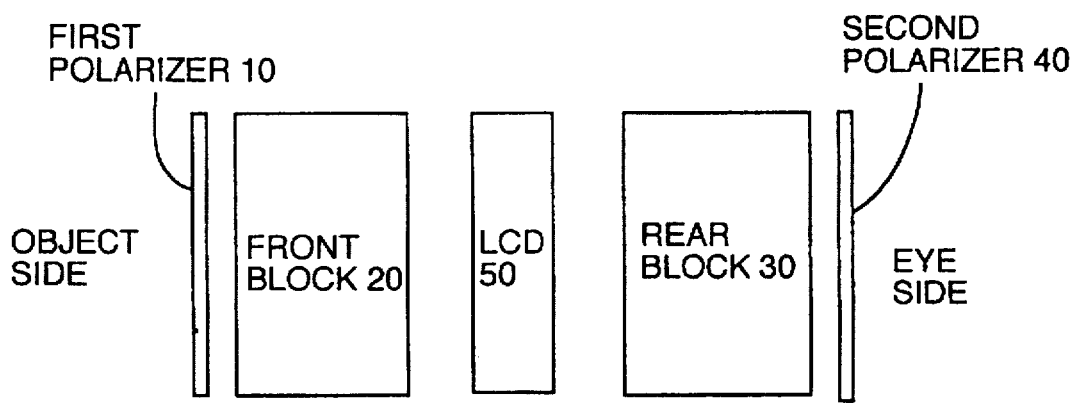
FIG. 14 shows a first arrangement of the LCD display panel, a pair of polarizers and optical elements, according to the present invention.

FIG. 14 shows a first arrangement of optical elements and the LCD panel of the finder optical system according to the present invention. In general, a real image finder comprises an objective lens, an erecting system and an eyepiece lens arranged in that order relative to an object to be viewed. In this first arrangement, a first polarizer 10 is positioned near an object side of the finder, and a front optical component 20 of optical elements is positioned between the first polarizer 10 and an LCD panel 50. Then a rear optical component 30 of optical elements is positioned between the LCD panel 50 and a second polarizer 40. The second polarizer 40 is located at the eye side of the finder. The LCD panel is positioned coincident with an in-focus image plane of an objective lens system (not shown) of the finder. With this first arrangement, all of the optical elements, such as the image erecting optics, are positioned between the first polarizer 10 and the second polarizer 40. This reduces the overall length of the finder optical system when compared with finder systems in which none of the optical components are positioned between the first and second polarizers 10, 40. Further, since the optical elements are thicker (in the optical axis direction) than the first and second polarizers 10, 40, there are fewer surfaces near to the in-focus image plane of the objective lens system where dust can adhere.

Figure 1:
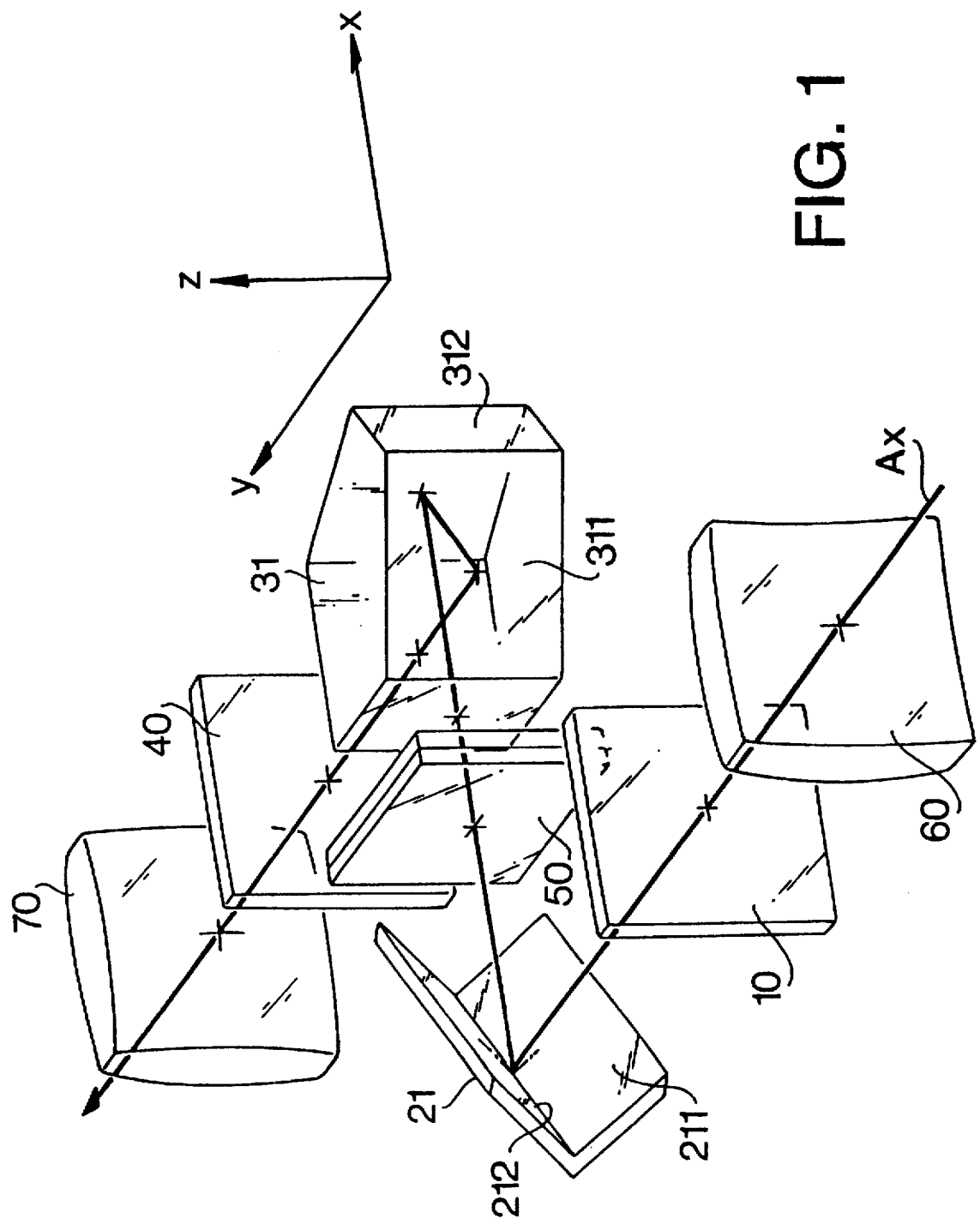
FIG. 1 shows a first embodiment of the finder optical system according to the present invention.

FIG. 1 shows a first embodiment of the finder optical system according to the first arrangement shown in FIG. 14. In this first embodiment, an objective lens 60 and an eyepiece lens 70 are provided. The lenses 60 and 70 prevent dust and other contaminants from getting inside the finder system.

In this first embodiment, front optical component 21 is a Dach mirror (or 'roof' mirror) having reflective surfaces 211 and 212. Rear optical component 31 is a pentaprism having reflective surfaces 311 and 312. As shown in FIG. 1, light incident on the Dach mirror is inverted as explained below and an image is formed on the in-focus image plane which is coincident with the image forming plane of the LCD display 50. The light is then incident on a reflective surface 312 of the pentaprism and reflected to reflective surface 311. The light is then reflected and viewed through the eyepiece lens 70. The reflective surfaces 311 and 312 are arranged such that the incident planes on each of the surfaces 311, 312 are parallel.

In this first embodiment, a ray incident on the Dach mirror and symmetrical about the axis between the reflective surface 211 and reflective surface 212 is reflected and inverted such that the reflected ray is symmetrical about an optical axis AX. Further, since the optical axis AX of the first embodiment is contained with a single plane and the reflected ray is not displaced in the z-axis direction relative to the optical axis AX, the overall height of the finder system can be made small.

As shown in FIG. 1, a front optical component 21 comprising a Dach mirror and a rear optical component 31 comprising a pentaprism are provided. As described above, since the front optical component 21 and rear optical component 31 are located between the polarizers 10 and 40, the overall length of the finder system can be reduced.

Figure 2:
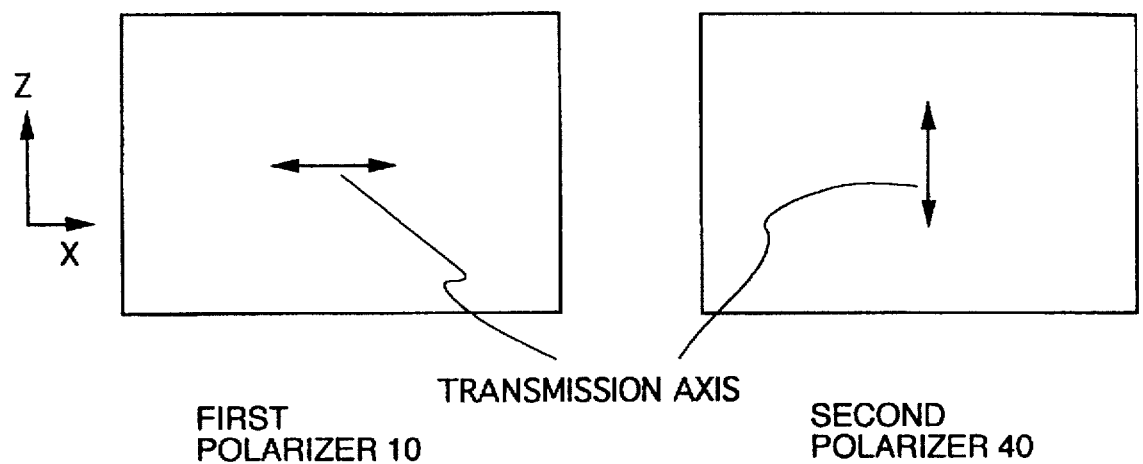
FIG. 2 shows an orientation of the first and second polarizers that are used in the first embodiment shown in FIG. 1.

FIG. 2 shows an arrangement of the first and second polarizers 10, 40. In FIG. 2, first polarizer 10 and second polarizer 40 allow linearly polarized light to pass through. Light which can pass through first polarizer 10 has a direction of polarization, or transmission axis, along the x-axis direction of the finder optical system (i.e. long side of the finder field of view). Light which can pass through second polarizer 40 has a transmission axis along the z-axis direction of the finder optical system (i.e., short side of the finder field of view). The angles (of polarization) 0° and 90° are defined with respect to the x-axis.

FIG. 3 shows an example of a display on the LCD panel 50 of the finder system embodying the present invention. The LCD panel 50 is a twisted nematic type of LCD panel. In order to produce an intelligible display using this type of LCD panel, first polarizer 10 and second polarizer 40 are disposed on either side of the LCD panel 50. The light incident on the LCD panel 50 is first polarized by the first polarizer 10. If a segment of the LCD display is to remain off (hereinafter referred to as an off-segment) the phase of the polarized light is changed by 90° and then transmitted through the second polarizer 40 which has a polarization that is 90° out of phase with the first polarizer. If the segment of the LCD panel 50 is on (hereinafter referred to as an on-segment), the polarization of the light is unaffected. However, the light cannot pass through the second polarizer 40, and therefore a black segment appears in the display. Further, in the portion where no segment appears, the polarization of the light is also changed by 90°, and thus the light is transmitted through the second polarizer 40.

In the example display shown in FIG. 3, a panorama mode has been selected. In the panorama mode, light shielding plates cover a portion of the photographing aperture thereby preventing light from exposing a portion of the film. In the finder system of the present invention, when the panorama mode is being used, a portion of the finder is made opaque in order to show the photographer the area of the frame that will be recorded on the film. In this finder, segments 54A and 54B of the LCD panel 50 are turned ON, which makes a portion of the finder opaque and modifies the size of the area of the frame seen by the photographer.

FIG. 3 also shows focusing area indicator brackets 51A, 51B, 52A, 52B, 53A and 53B. When an LCD segment corresponding to each bracket is turned ON, a portion of the finder display is made opaque, resulting in the bracket being seen by the photographer. The pair of brackets which are displayed in the finder depend on the focal length of a zoom lens used with the camera. When the focal length is relatively small (i.e., the zoom lens is in a wide angle setting), the brackets 51A, 51B are displayed. When the focal length is in a medium range (i.e., the zoom lens is in a moderate angle setting) the brackets 52A, 52B are displayed. When the focal length is relatively long (i.e., the zoom lens is in a telephoto setting) the brackets 53A, 53B are displayed. Further, only one pair of brackets is ever displayed at one time, as shown by brackets 53A, 53B in FIG. 3.

The above description of the operation of the LCD panel 50 represents an ideal situation in which the incident light is perfectly polarized. However, if the polarized incident light is reflected by a reflecting surface which introduces a phase shift, the reflected light will have a slightly different state of polarization from the incident light. If this reflected light is transmitted through an off-segment of the LCD panel 50, the phase shifted polarized light which does not have a polarization corresponding to that of the second polarizer 40 will not be transmitted through the second polarizer 40. This reduction in light transmitted through the off-segment will produce a difference in contrast between an off-segment and a portion of the LCD panel 50 having no segment. Depending on the properties of the reflective surface, this change is in contrast may be noticeable to the user, resulting in the off-segment being visible. The user may find the visibility of the off-segment brothersome and therefore, the visibility of the off segment should be minimized.

Figure 4:
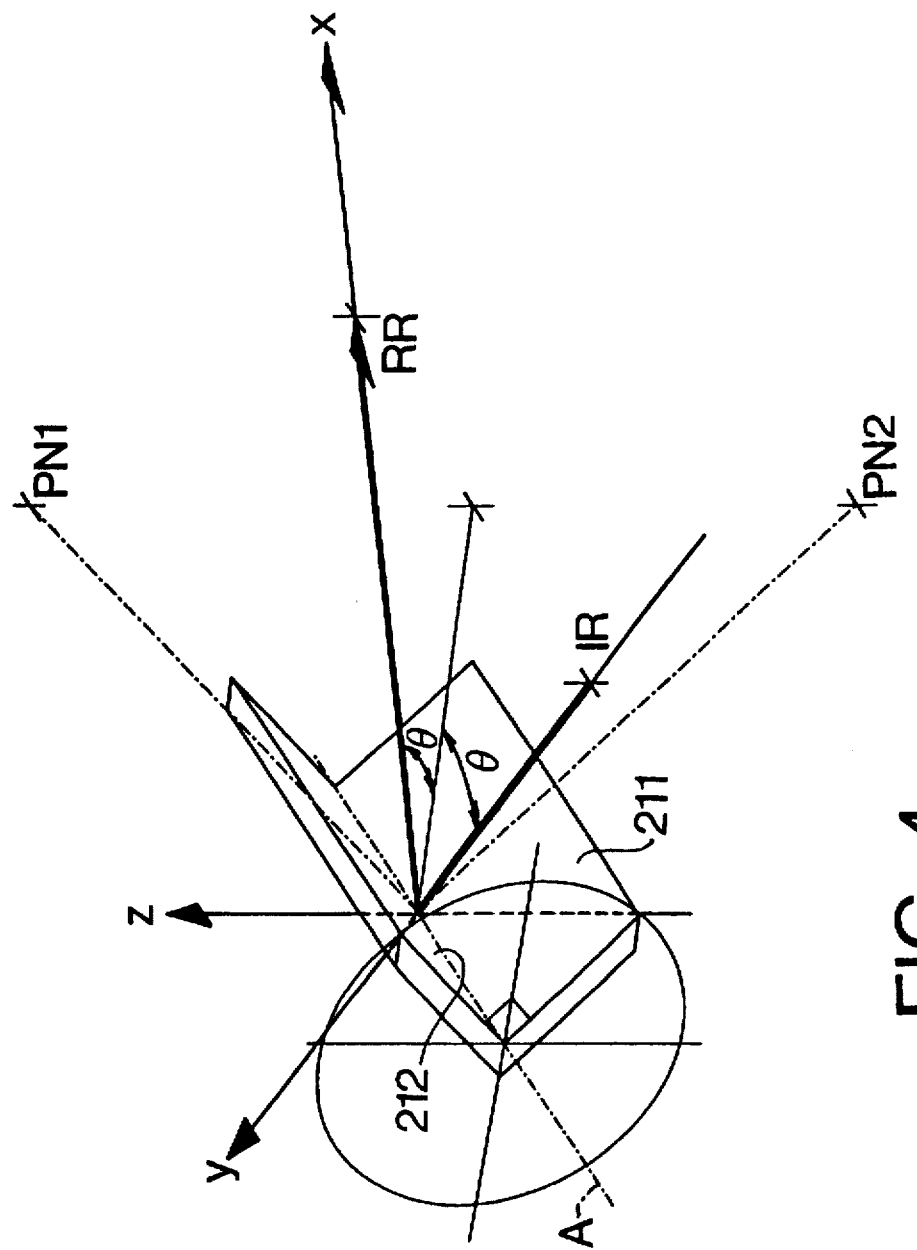
FIG. 4 shows a ray diagram of light incident on a Dach mirror used in the first embodiment shown in FIG. 1.

FIG. 4 shows the Dach mirror used in the first embodiment shown in FIG. 1. As shown in FIG. 4, IR represents a ray incident on the ridge or axis A of the Dach mirror. RR represents a ray reflected from the ridge A of the Dach mirror. PN1 and PN2 represent normals to the surfaces 211 and 212 at the point where the ray IR is incident on the ridge A of the Dach mirror.

An incident plane of the reflecting surface 211 is defined as a plane which contains the incident ray IR and the normal PN1. Similarly, an incident plane of the reflecting surface 212 is defined as a plane which contains the incident ray IR and the normal PN2.

The Dach mirror is constructed such that half of the incident light ray IR is reflected by the upper surface 212 and then reflected by the lower surface 211, while the other half of the incident light ray IR is reflected by the lower surface 211 and then by the upper surface 212. This produces an inverted and left-right reversed image. Further, the ridge A of the Dach mirror is included in the same XY plane as the optical axis AX, and the angle between the ridge A and the optical axis to 45°.

The reflective surfaces 211 and 212 of the Dach mirror are perpendicular to each other. Further, the Dach mirror is classified as a first type element in which the incident planes of the reflecting surfaces are neither parallel nor perpendicular to each other. Therefore, polarized light incident on the Dach mirror will have some phase shift in its S and P components. To reduce this effect, the transmission axis of the polarized light incident on the Dach mirror should be parallel (or perpendicular, as explained below) to a plane containing the ridge A of the Dach mirror (i.e., the first and second polarizer 10 and 40 should have the orientation as shown in FIG. 2). This result was determined experimentally by the inventors and is explained more fully below.

Figure 5:
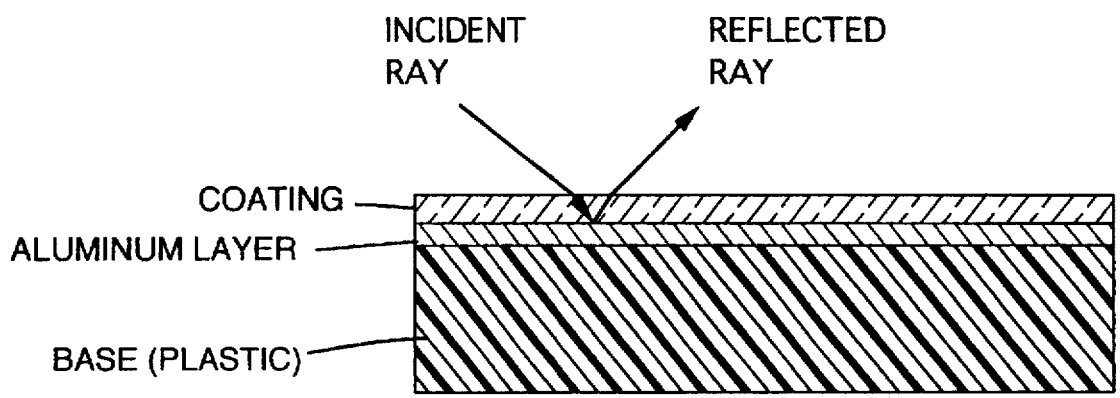
FIGS. 5 and 6 show two examples of types of materials used in the reflecting elements of the front and rear optical components of the first embodiment shown in FIG. 1.
Figure 6:
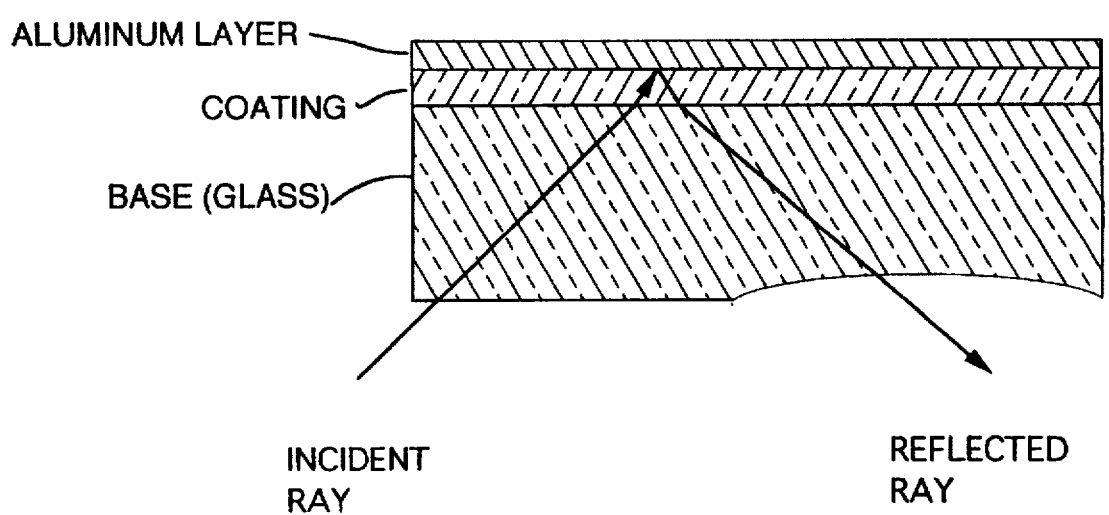

FIGS. 5 and 6 show two types of reflective elements employed in optical systems. One type of reflective element (shown in FIG. 5) uses a plastic base having an aluminum layer formed thereon. A coating is applied to the aluminum layer to improve the reflectivity of the aluminum. Generally the reflectivity of the aluminum can be increased from 85% to about 95% depending on the coating that is applied.

Another reflective element (shown in FIG. 6) uses a glass base having a coating applied thereon. The aluminum layer is applied to the coating. Again the coating is used to improve the reflectivity of the aluminum layer.

In the reflective element of FIG. 5, the light that is transmitted through the surrounding medium (i.e., air) is incident on the aluminum layer after passing through the coating. The light is then reflected by the aluminum layer and passes through the coating and enters the air. In the reflective element of FIG. 6, the light is transmitted through the glass, then passes through the coating and is incident on the aluminum layer. The light is then reflected by the aluminum layer and passes through the coating and enters the glass.

Five tests of different combinations of coatings applied to the aluminum layer were conducted in order to determine which combination of coatings maximize the reflectivity of the Dach mirror. The five different coating combinations are summarized in Table 1. The term 'nd' represents the product of the refractive index 'n' and the thickness of the coating 'd' measured in μm. Further, the coatings are listed in order in which they are applied on the base aluminum layer. For instance, the coating combination of example 1 has the $SiO_2$ layer (nd=74.75) applied to the aluminum base layer, with the $TiO_2$ layer applied on top of the $SiO_2$ layer, and another $SiO_2$ layer (nd=177.00) applied on top of the $TiO_2$ layer.

TABLE 1

| Example | Layer | nd |
| --- | --- | --- |
| 1 | Aluminum | — |
|  | $SiO_2$ | 74.75 |
|  | $TiO_2$ | 48.25 |
|  | $SiO_2$ | 177.00 |
| 2 | Aluminum | — |
|  | $SiO_2$ | 25.25 |
|  | $TiO_2$ | 93.50 |
|  | $SiO_2$ | 148.00 |
| 3 | Aluminum | — |
|  | $Al_2O_3$ | 75.50 |
|  | $MgF_2$ | 152.50 |
| 4 | Aluminum | — |
|  | $SiO_2$ | 89.97 |
|  | $TiO_2$ | 89.97 |
|  | $Al_2O_3$ | 89.97 |
| 5 | Aluminum | — |

However, when the different coatings were applied to the aluminum layer, different effects on the polarization of the incident light were observed. Further, the effects on the polarized light were different depending on the angle of the transmission axis of the polarized light relative to the ridge line of the Dach mirror. For 0° linearly polarized incident light (i.e., light having a polarization axis which is parallel to a plane containing the ridge of the Dach mirror), the Dach mirror had little affect on the polarization of the light. However, the affect on the polarization of the +45° linearly polarized incident light was much greater.

Figure 7A:
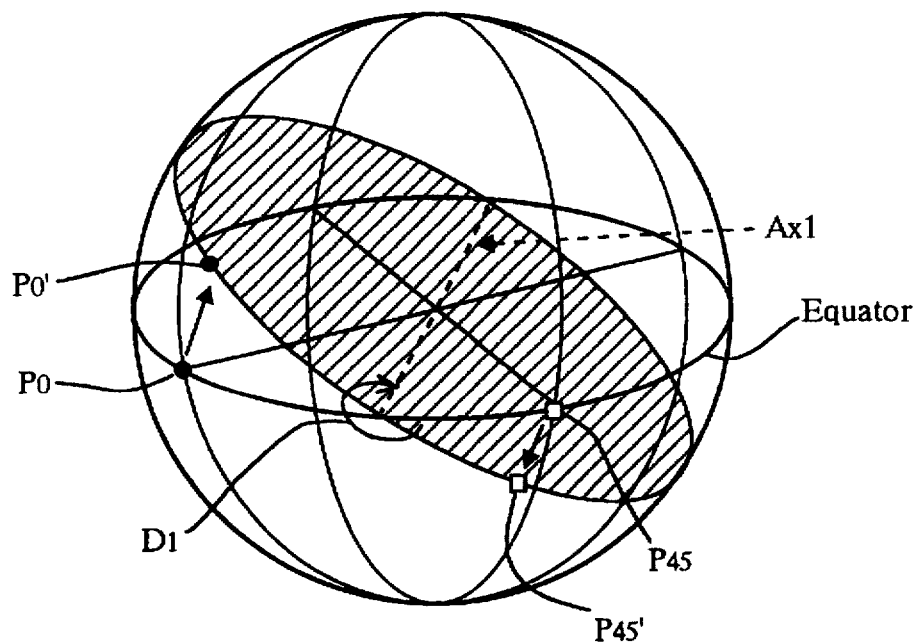
FIGS. 7A and 7B show Poincaré spheres which illustrate shifts in polarization of light when light is reflected by the Dach mirror shown in FIG. 4.
Figure 7B:
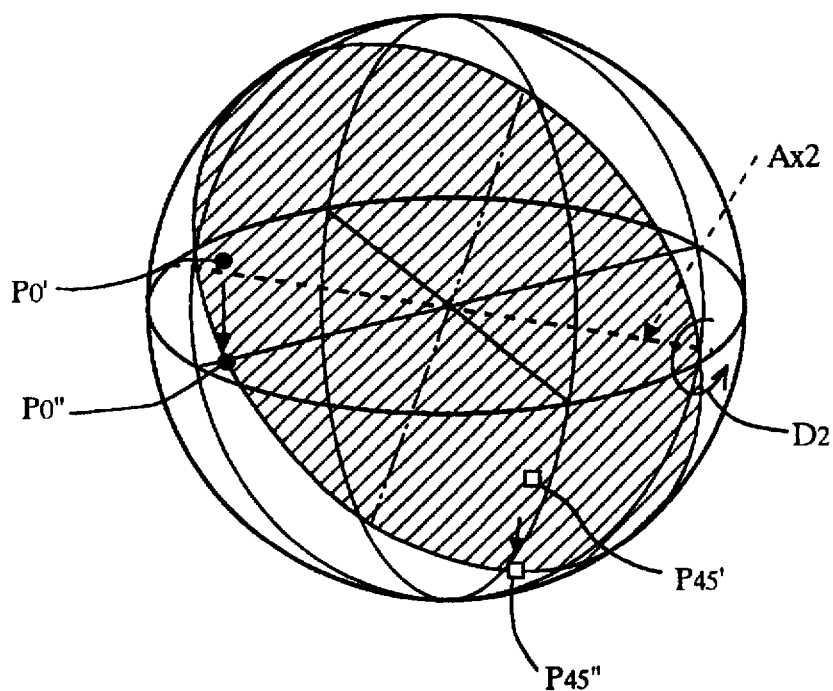

FIGS. 7A and 7B shows plots of a Poincaré sphere used to illustrate the change in polarization of light reflected by the Dach mirror. As shown in FIG. 7A, an equatorial circumference of the Poincaré sphere represents linear polarization, whereas the poles represent circular polarization. The remaining area represents elliptical polarization which lies between linear and circular polarization.

Point P0 represents 0° linear polarized incident light while Point P45 represents incident light having +45° linear polarization.

An orientation of an axis AX1 of rotation of an equatorial plane containing P0 and P45 is determined based on the azimuth angle of the first reflective surface 211 of the Dach mirror 21 relative to the incident light ray. Then the equatorial plane is rotated about axis AX1 by an angle equal to the phase shift in the polarization of the light when reflected by the first reflecting surface 211. Therefore, point P0 is moved to point P0' and point P45 is moved to point P45'

In order to see the effect of the reflection by the second reflecting surface 212 of the Dach mirror 21, the plane containing P0' and P45' is rotated about axis AX2 by the angle equal to the phase shift of the polarization of the light. This results in point P0' moving to P0" and point P45' moving to P45", as shown in FIG. 7B. Thus, as also shown in FIG. 7B, the point P0" is very near the first point P0, and so the overall effect of the Dach mirror on the polarization of the 0° linearly polarized incident light is small. However, point P45" is much further away from the point P45, and therefore the effect on the polarization of the +45° linearly polarized incident light is large.

Further, the effect on 90° linearly polarized incident light is similar to that of 0° linearly polarized incident light as shown by the symmetry of the Poincaré sphere. Furtheremore, the effect on –45° linearly polarized incident light is also similar to that of +45° linearly polarized incident light.

In the above description, the light was reflected by the first surface 211 of the Dach mirror and then by the second surface 212. However, the order of reflection may be reversed, resulting in a similar effect being observed.

Figure 15:
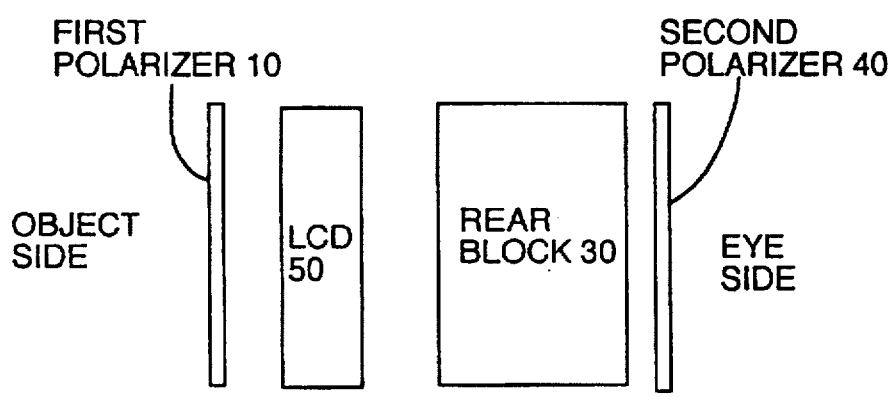
FIG. 15 shows a second arrangement of the LCD display panel, the pair of polarizers and optical elements, according to the present invention.

FIG. 15 shown a second arrangement of the optical elements and the LCD panel 50 according to the present invention. In this second arrangement, the first polarizer 10 is positioned near an object side of the finder. Then the LCD panel 50 is positioned between the first polarizer 10 and the rear optical component 30 of optical elements. The second polarizer 40 is located at the eye side of the finder behind the rear optical component 30. With this second arrangement, since some of the optical elements such as the image erecting optics are positioned between the LCD panel 50 and the second polarizer 40, the overall length of the finder can be reduced when compared with the finder in which none of the optical elements are placed between the LCD panel 50 and the second polarizer 40. Further, since the optical elements are thicker (in the optical axis direction) than the polarizers 10, 40, there are fewer surfaces near to the in-focus image plane of the LCD panel 50 where dust can adhere, as shown in the first arrangement described above.

Figure 8:
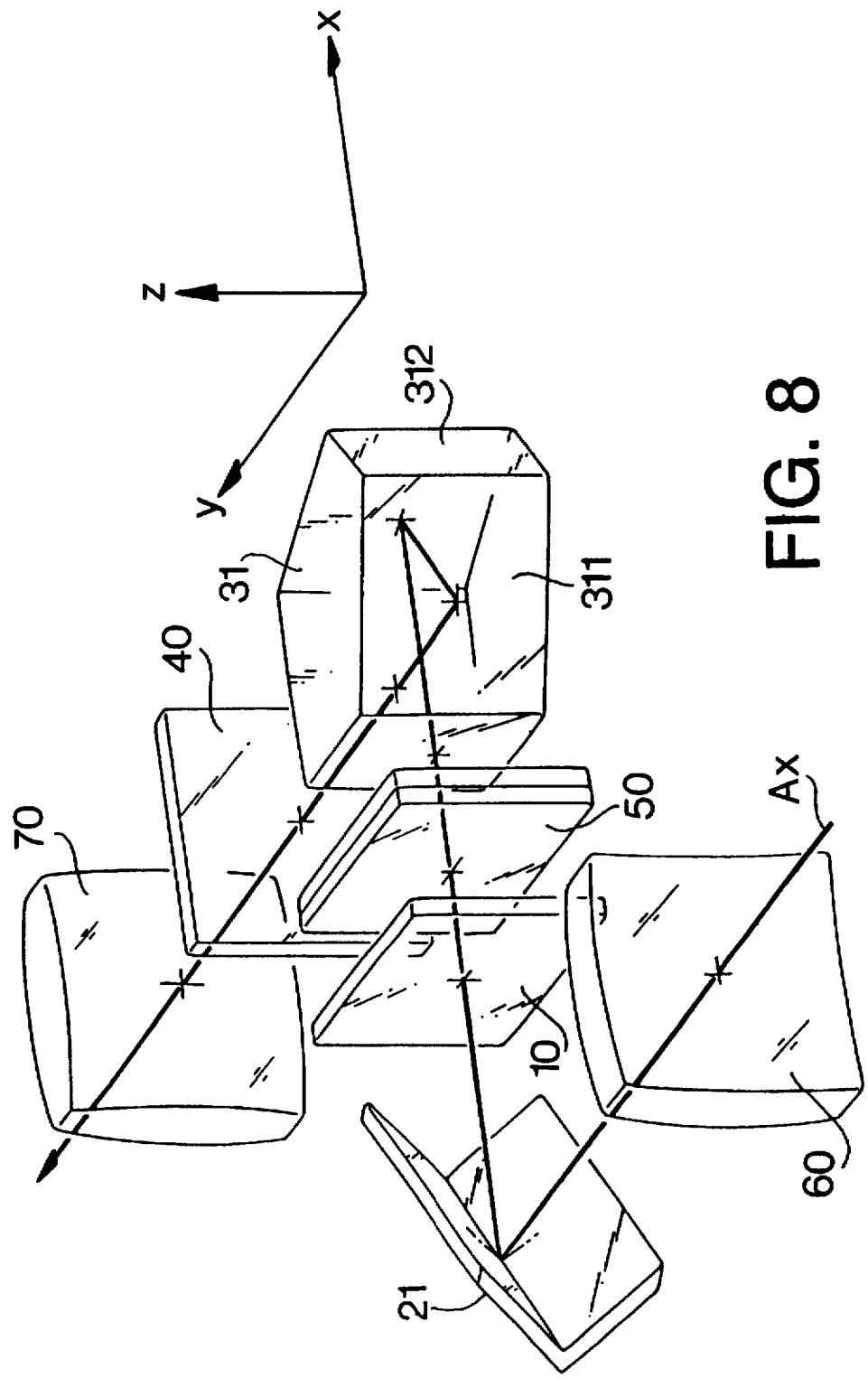
FIG. 8 shows a second embodiment of the finder optical system according to the present invention.

FIG. 8 shows a second embodiment according to the present invention. The optical elements of the second embodiment are arranged according to the second arrangement shown in FIG. 15. Further, the Dach mirror 21 and the pentaprism 31 used in the first embodiment are also used in the second embodiment. However, the Dach mirror 21 is positioned between the first polarizer 10 and the objective lens 60.

In this second embodiment, the overall height of the finder system can be reduced as explained above for the first embodiment, since the Dach mirror is employed as the image erecting system. Further, the overall length of the finder system can be reduced since the rear optical component 31 is placed between the LCD 50 and second polarizer 40.

Furthermore, in this second embodiment, since the Dach mirror is not between the first and second polarizers 10, 40, the phase shift of polarization introduced by the Dach mirror does not affect the image seen in the finder optical system. Further, the pentaprism is a second type element where the incident planes of the reflecting surfaces are parallel to each other and parallel to one of the sides of the finder field of view. Therefore, the transmission axes of the polarizers 10 and 40 can be the same as shown in FIG. 2 as well as those shown in FIG. 9. Thus, it is possible to orient the first polarizer 10 such that it allows +45° linearly polarized light to pass through. Similarly, the second polarizer 40 should be oriented 90° out of phase with the first polarizer 10, to allow –45° linearly polarized light to pass through. With this orientation, the first polarizer 10 is a mirror image of the second polarizer 40, and therefore by turning the first polarizer 10 back to front, the polarizing effect of the second polarizer 40 can be achieved. Therefore, during manufacturing of the finder optical system according to this second embodiment, only one type of polarizer needs to be manufactured, thereby reducing the number of parts in the camera.

Figure 9:
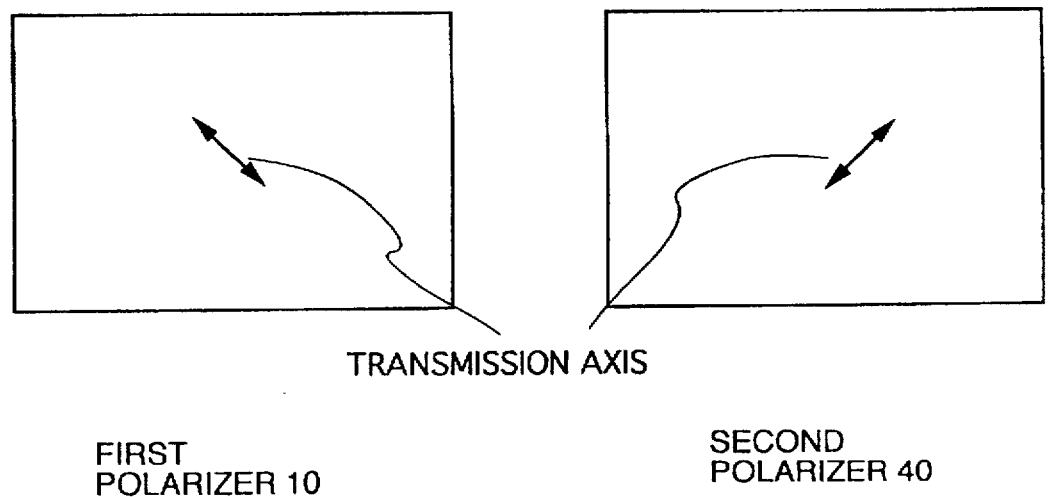
FIG. 9 shows an orientation of the first and second polarizers that are used in the second embodiment shown in FIG. 8.

However, if using this second embodiment with the polarizers 10, 40 arranged according to FIG. 9, the light incident on the pentaprism 31 is +45° linearly polarized and the reflective surfaces 311 and 312 of the pentaprism will introduce some phase shift into the polarization of the incident light as explained below.

The reflective surfaces 311 and 312 of the pentaprism are similar to the reflective element shown in FIG. 6, where a coating is applied to a surface of the glass base and an aluminum layer is formed on the coating. Five different combinations of coatings applied between the aluminum layer and the glass base and were tested for the effect on the phase of linearly polarized light that was reflected by a reflective surface of the pentaprism. The five different combinations are summarized in Table 2.

TABLE 2

| Example | Layer | nd |
|---|---|---|
| 6 | Aluminum | — |
|  | MgF$_2$ | 47.53 |
|  | TiO$_2$ | 23.25 |
|  | Glass | — |
| 7 | Aluminum | — |
|  | MgF$_2$ | 134.50 |
|  | TiO$_2$ | 96.35 |
|  | Glass | — |
| 8 | Aluminum | — |
|  | MgF$_2$ | 208.75 |
|  | TiO$_2$ | 40.75 |
|  | MgF$_2$ | 100.75 |
|  | TiO$_2$ | 269.25 |
|  | Al$_2$O$_3$ | 271.50 |
|  | Glass | — |
| 9 | Aluminum | — |
|  | MgF$_2$ | 135.00 |
|  | TiO$_2$ | 135.00 |
|  | Glass | — |
| 10 | Aluminum | — |
|  | Glass | — |

Figure 10:
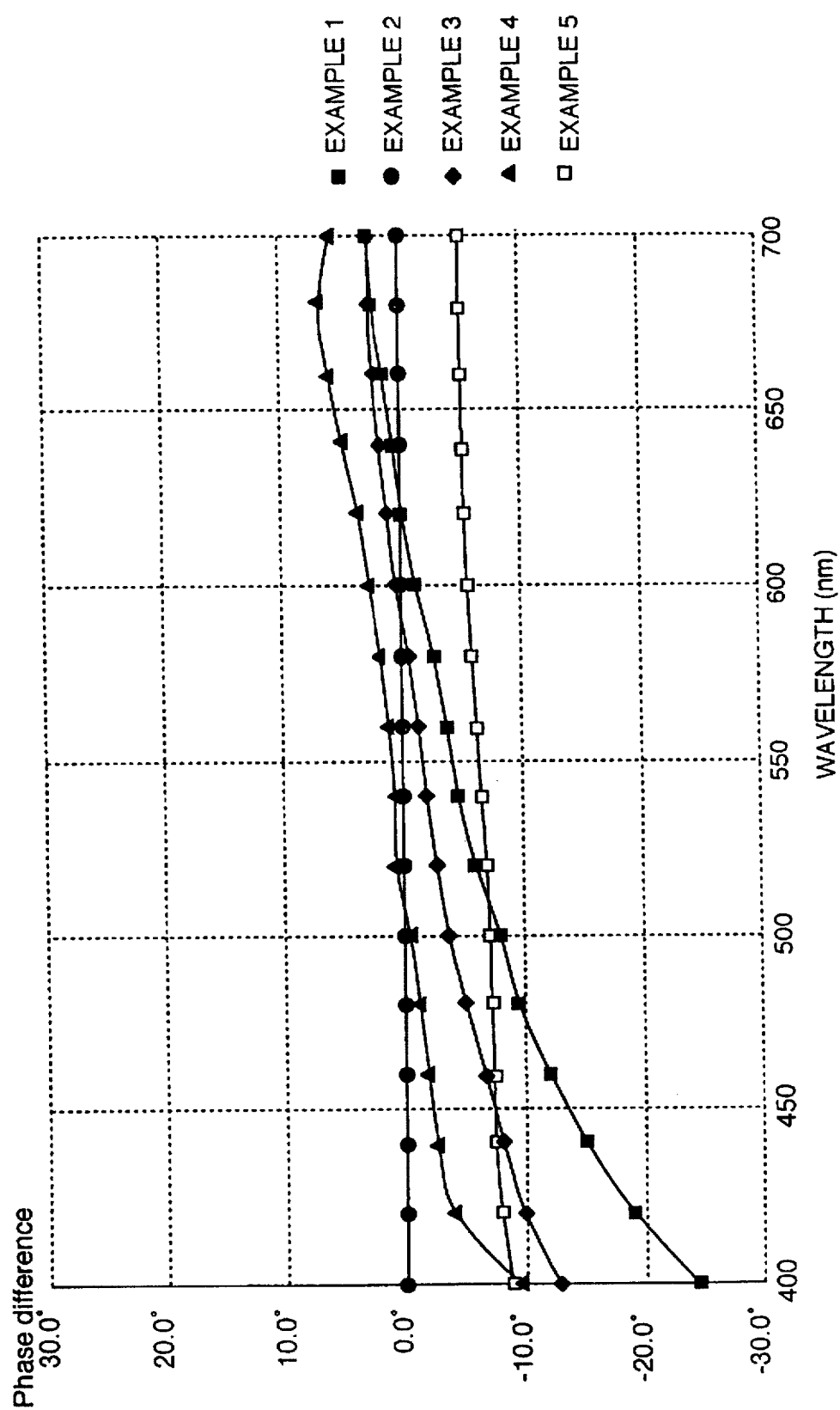
FIG. 10 shows a plot of the phase shift of linearly polarized light after being reflected by a reflecting surface of a pentaprism of the second embodiment shown in FIG. 8, for five different types of coatings, over a range of wavelengths of light.

FIG. 10 shows a plot of the phase shift of polarized light after reflection by one of the reflective surfaces of the pentaprism with respect to the wavelength of the polarized light (in this case for light having a wavelength from 400 nm to 700 nm). The letters B, G and R refer to the color of the light (i.e., blue, green and red, respectively). The five plots shown correspond to the coating combinations of examples 6 through 10 listed in Table 2.

As shown in FIG. 10, when the pentaprism has the coating of example 7 applied between the glass and the aluminum layer, the phase shift of the polarized light has the least variation over the range of wavelengths shown. Further, this coating produces negligible phase shift and therefore is the most suitable coating for the reflective surfaces of the pentaprism in order to prevent a phase shift in the polarized light reflected by the reflective surfaces.

Figure 11:
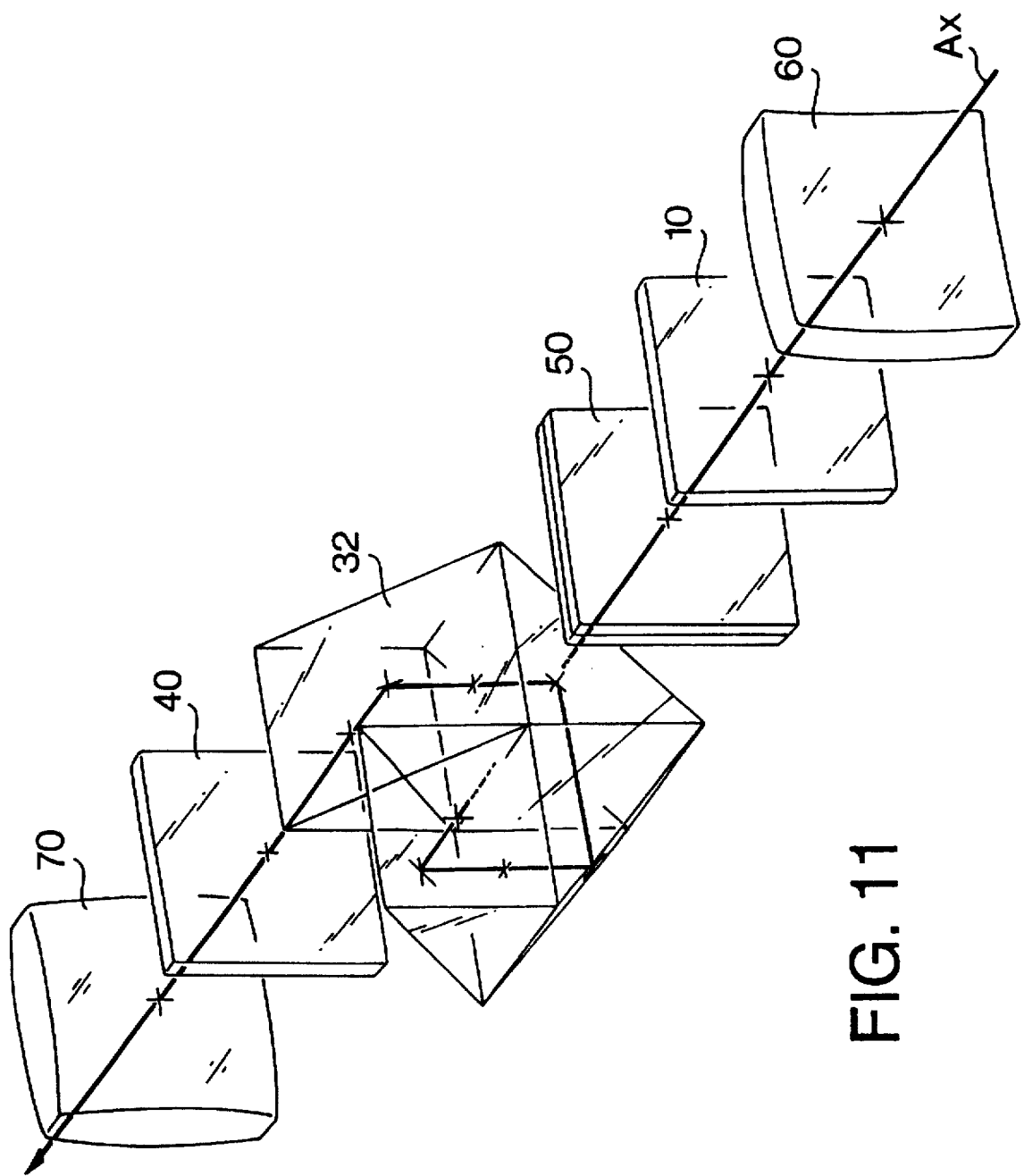
FIG. 11 shows a third embodiment of the finder optical system according to the present invention.

FIG. 11 shows a third embodiment according to the present invention. The optical elements of this third embodiment are also arranged according to the second arrangement shown in FIG. 15. Further, rear optical component 32, which is a Porro prism erects an image of the object. The Porro prism is optically equivalent to a combination of the prisms having reflecting surfaces 401 and 402 shown in FIG. 12. By using the Porro prism, only one image erecting optical element is required in this third embodiment. Further, since the Porro prism is positioned between the LCD panel 50 and the second polarizer 40, the overall length of the finder system can be reduced.

Figure 12:
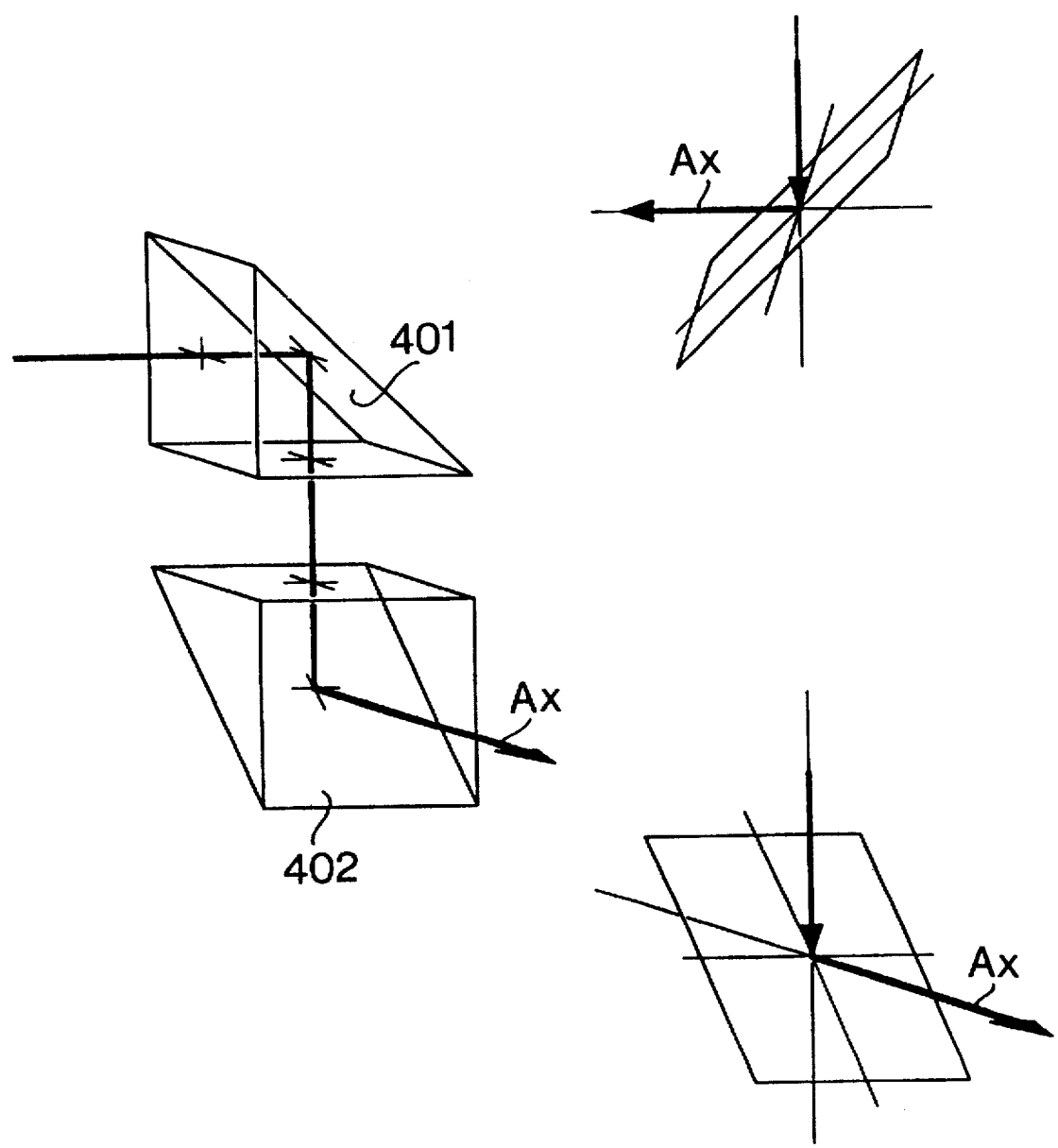
FIG. 12 shows a ray diagram of light incident on a pair of mirrors having incident planes which are perpendicular to each other.

FIG. 12 shows the prisms arranged such that the incident plane for reflecting surface 401 is perpendicular to the incident plane for reflecting surface 402. As shown in FIG. 12, the entire incident light ray is reflected by reflecting surface 401 towards reflecting surface 402, and then reflected by reflecting surface 402 as an exit ray.

Since the Porro prism is a third type element in which the incident planes are perpendicular to each other, any phase shift introduced to the polarization of the light by one of the reflecting surfaces is cancelled by the phase shift introduced by the other reflecting surface, when the phase shifts of the two surfaces are the same. With this construction the polarization of the incident light is not limited to 0° but can also be +45°. Therefore, either arrangement of the first and second polarizers 10, 40 shown in FIGS. 2 and 9 may be used. Further, the transmission axis of the first polarizer 10 is not limited to 0° or +45°, but any transmission axis may be used. The second polarizer 40 must then be arranged to have a polarization which is 90° out of phase with the first polarizer 40. Furthermore, the type of coating applied to the reflective surfaces produces no cumulative effect on the polarization of the light.

Figure 13:
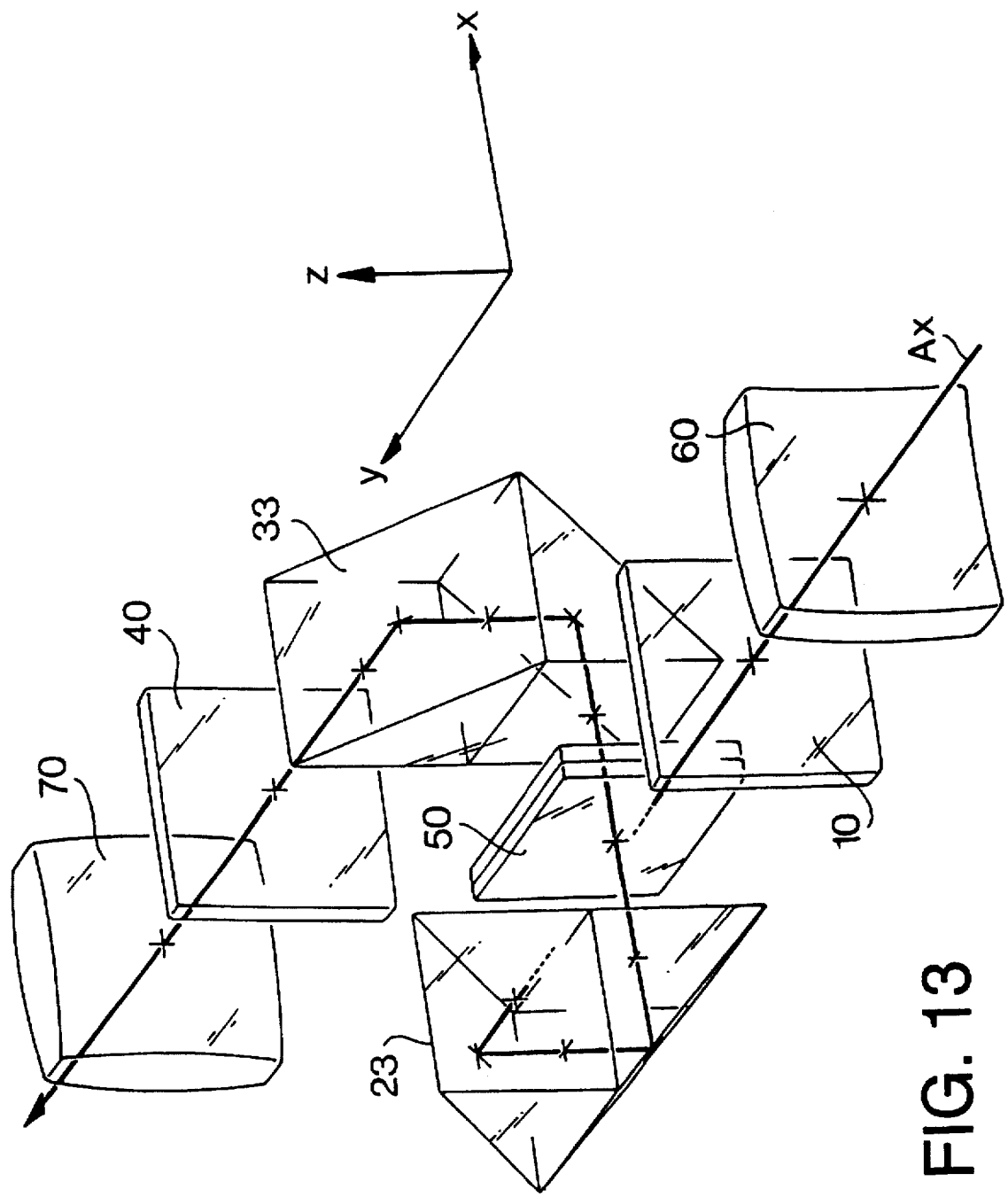
FIG. 13 shows a fourth embodiment of the finder optical system according to the present invention.

FIG. 13 shows a fourth embodiment according to the present invention. The optical elements of this fourth embodiment are arranged according to the first arrangement shown in FIG. 14. The combination of the front optical component 23 and the rear optical component 33 is optically equivalent to the Porro prism shown in rear optical component 32 of the third embodiment. Further, both of the front optical component 23 and rear optical component 33 are third type elements. Therefore, the polarization of the incident light may be 0° or +45°, as described above. However, by using the front optical component 23 and rear optical component 33, the number of surfaces near the in-focus image plane can be reduced. This reduces the number of surfaces which dust can adhere to. Further, by placing the front optical component 23 and rear optical component 33 between the polarizers 10 and 40, the length of the finder optical system can be reduced.

Figure 16:
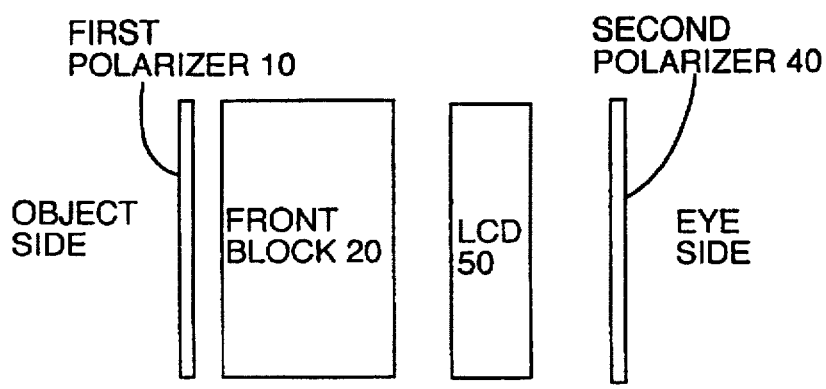
FIG. 16 shows a third arrangement of the LCD display panel, the pair of polarizers and optical elements, according to the present invention.

FIG. 16 shows a third arrangement of the optical elements and the LCD panel 50 according to the present invention. In this third arrangement, the first polarizer 10 is positioned near an object side of the finder. The front optical component 20 of optical elements is positioned between the first polarizer 10 and the LCD panel 50. The second polarizer 40 is located at the eye side of the finder behind the LCD panel 30.

Figure 17:
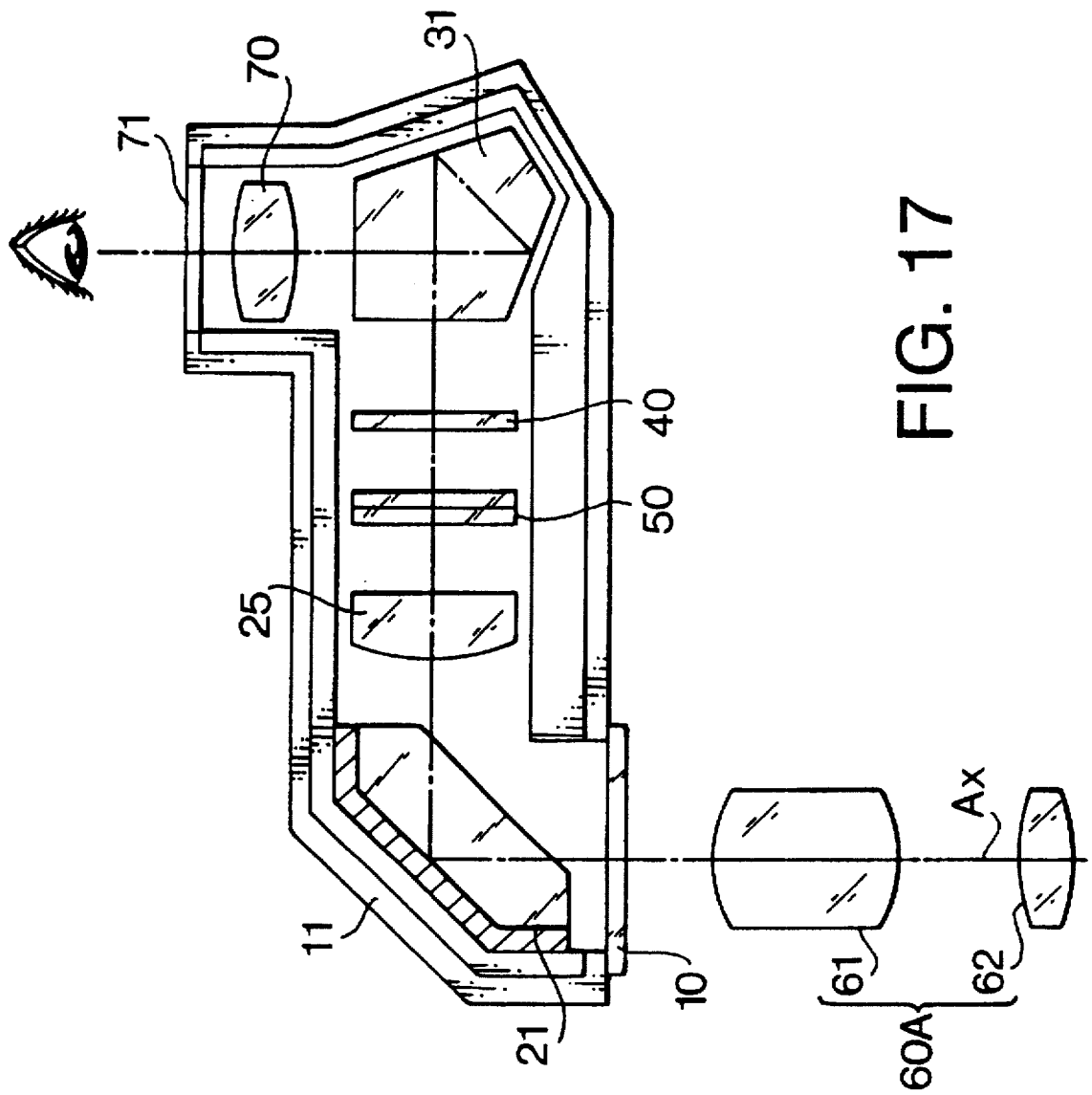
FIG. 17 shows a fifth embodiment of the finder optical system according to the present invention.

With this third arrangement, some of the optical elements such as the image erecting optics are positioned between the first and second polarizers 10 and 40, respectively. This reduces the overall length of the finder optical system. Further, since the optical elements are thicker (in the optical axis direction) than the polarizers 10, 40, there are fewer surfaces near to the in-focus image plane of the LCD panel 50 where dust can adhere, as shown in the first arrangement described above. FIG. 17 shows a fifth embodiment according to the present invention. This fifth embodiment has the third arrangement of the optical components shown in FIG. 16.

As shown in FIG. 17, the front optical component consists of the Dach mirror 21 and a condenser lens 25. An objective lens group 60A consists of two lenses 61 and 62. The first polarizer 10 is positioned between the objective lens group 60A and the Dach mirror 21. The transmission axis of the first polarizer 10 is parallel to a plane containing the ridge of the Dach mirror 21, as shown in FIG. 2. The LCD panel 50 is positioned between the second polarizer 40 and the condenser lens 25. The transmission axis of the second polarizer 40 is perpendicular to the transmission axis of the first polarizer, as shwn in FIG. 2. The pentaprism 31 is positioned between the second polarizer 40 and the eyepiece lens 70. The first polarizer 10 together with a glass panel 71 seal casing 11 making the casing 11 airtight.

With this construction, some of the optical components used in the finder system are positioned between the first polarizer 10 and the LCD panel 50. Therefore, the number of surfaces near the in-focus image plane is reduced. Further, by placing these optical components between the first polarizer 10 and the LCD panel 50, the length of the finder system can be reduced.

The present disclosure relates to subject matter contained in Japanese Utility Model Application No. Hei 6-000192 filed on Jan. 25, 1994, which is expressly incorporated herein by reference in its entirety.

What is claimed is:

1. A real image finder system having an objective lens, an eyepiece lens and deflecting system that includes an erecting optical system that is positioned between said objective lens and said eyepiece lens, said finder system comprising:

an LCD panel located on an image plane of said objective lens, said LCD panel displaying information to be viewed through said eyepiece lens;

a first polarizer positioned between said objective lens and said LCD panel; and a second polarizer positioned between said LCD panel and said eyepiece lens, wherein at least one optical component of said deflecting system is located between said first polarizer and said second polarizer.

2. The finder system according to claim 1, a direction of a transmission axis of said second polarizer being perpendicular to a direction of a transmission axis of said first polarizer.

3. The finder system according to claim 1, wherein one optical component of said deflecting system is positioned between said first polarizer and said second polarizer.

4. The finder system according to claim 3, a direction of a transmission axis of said second polarizer being perpendicular to a direction of a transmission axis of said first polarizer.

5. The finder system according to claim 3, wherein said one optical component comprises two reflecting surfaces having incident planes parallel to each other, and wherein a direction of a transmission axis of said first polarizer forms an angle of one of 0 and 90 degrees with a direction of said incident planes in a plane perpendicular to an optical axis.

6. The finder system according to claim 5, a direction of a transmission axis of said second polarizer being perpendicular to a direction of a transmission axis of said first polarizer.

7. The finder system according to claim 3, wherein said one optical component comprises two reflecting surfaces having incident planes parallel to each other, wherein a direction of a transmission axis of said first polarizer forms an angle of one of 45 and −45 degrees with respect to a direction of said incident planes in a plane perpendicular to an optical axis, and wherein said two reflecting surfaces have a coating for preventing a phase shift in the polarized light reflected by said two reflecting surfaces.

8. The finder system according to claim 7, a direction of a transmission axis of said second polarizer being perpendicular to a direction of a transmission axis of said first polarizer.

9. The finder system according to claim 3, wherein said one optical component comprises at least one set of two reflecting surfaces having incident planes perpendicular to each other.

10. The finder system according to claim 9, a direction of a transmission axis of said second polarizer being perpendicular to a direction of a transmission axis of said first polarizer.

11. The finder system according to claim 9, wherein said one optical component comprises two sets of two reflecting surfaces having incident planes perpendicular to each other.

12. The finder system according to claim 11, a direction of a transmission axis of said second polarizer being perpendicular to a direction of a transmission axis of said first polarizer.

13. The finder system according to claim 3, wherein said one optical component comprises a Dach mirror, said Dach mirror having reflecting surfaces with incident planes which are not parallel and not perpendicular to each other, and wherein a direction of a transmission axis of said first polarizer forms an angle of one of 0 and 90 degrees with respect to a direction of a ridge line of said Dach mirror in a plane perpendicular to an optical axis.

14. The finder system according to claim 13, a direction of a transmission axis of said second polarizer being perpendicular to a direction of a transmission axis of said first polarizer.

15. The finder system according to claim 1, wherein two optical components of said deflecting system are positioned between said first polarizer and said second polarizer.

16. The finder system according to claim 15, wherein one of said two optical components is positioned between said first polarizer and said LCD panel, and wherein another of said two optical components is positioned between said LCD panel and said second polarizer.

17. The finder system according to claim 16, wherein one of said two optical components comprises a Dach mirror having reflecting surfaces with incident planes which are not parallel and not perpendicular to each other, and wherein a direction of a transmission axis of said first polarizer forms an angle of one of 0 and 90 degrees with the direction of a ridge line of said Dach mirror in a plane perpendicular to an optical axis.

18. The finder system according to claim 17, wherein said another of said two optical components comprises two reflecting surfaces having incident planes parallel to each other.

* * * * *

UNITED STATES PATENT AND TRADEMARK OFFICE
CERTIFICATE OF CORRECTION

PATENT NO. : 5,752,107
DATED : May 12, 1998
INVENTOR(S) : Sachio HASUSHITA et al.

It is certified that error appears in the above-identified patent and that said Letters Patent is hereby corrected as shown below:

At column 10, line 40 (claim 1, line 2) of the printed patent, after "and", insert —a—.

At column 10, line 43 (claim 1, line 5) of the printed patent, "an" should be —a single—.

At column 10, line 44 (claim 1, line 6) of the printed patent, after "said", insert —single—.

At column 10, line 49 (claim 1, line 10) of the printed patent, after "said", insert —single—.

At column 10, line 48 (claim 1, line 9) of the printed patent, after "said", insert —single—.

At column 12, line 19 (claim 16, line 3) of the printed patent, after "said", insert —single—.

At column 12, line 20 (claim 16, line 4) of the printed patent, after "said", insert —single—.

Signed and Sealed this

Twenty-ninth Day of February, 2000

Attest:

Attesting Officer

Q. TODD DICKINSON

Commissioner of Patents and Trademarks